(12) United States Patent
Kawamura et al.

(10) Patent No.: US 6,536,108 B2
(45) Date of Patent: Mar. 25, 2003

(54) METHOD OF AND APPARATUS FOR PRODUCING REAR HOLDER-ATTACHED CONNECTOR

(75) Inventors: Norio Kawamura, Shizuoka (JP); Hiroshi Murashita, Shizuoka (JP); Junichi Hamamoto, Shizuoka (JP); Takashi Masuda, Shizuoka (JP); Toshimi Nakashima, Shizuoka (JP); Kazuhiko Hiraguchi, Shizuoka (JP); Kenji Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 70 days.

(21) Appl. No.: 09/739,324

(22) Filed: Dec. 19, 2000

(65) Prior Publication Data

US 2001/0003867 A1 Jun. 21, 2001

(30) Foreign Application Priority Data

Dec. 20, 1999 (JP) ............................ 11-361555

(51) Int. Cl.$^7$ ............................................... H01R 43/00
(52) U.S. Cl. ...................... 29/883; 264/297.2; 425/556
(58) Field of Search ......................... 29/883, 884, 825, 29/855, 856, 874, 876, 877, 881, 745, 746, 747, 749, 754, 760; 264/238, 318, 297.2, 328.8, 334; 425/556

(56) References Cited

U.S. PATENT DOCUMENTS

| 5,355,583 | A | * | 10/1994 | Osumi et al. ............... 29/876 |
| 5,378,422 | A | * | 1/1995 | Musiel et al. ............. 264/238 |
| 5,814,356 | A | | 9/1998 | Ito et al. .................. 425/556 |
| 5,911,935 | A | * | 6/1999 | Kawase .................... 264/238 |
| 5,915,760 | A | * | 6/1999 | Kawase et al. ............. 29/883 |
| 5,961,910 | A | | 10/1999 | Ito et al. .................. 264/238 |
| 6,206,681 | B1 | * | 3/2001 | Kawase et al. ............. 264/238 |
| 6,318,991 | B1 | * | 11/2001 | Kawase .................... 425/444 |
| 2001/0011785 | A1 | * | 8/2001 | Kawamura et al. |
| 2001/0013672 | A1 | * | 8/2001 | Kawamura et al. |
| 2001/0051468 | A1 | * | 12/2001 | Kashiyama et al. |
| 2001/0053638 | A1 | * | 12/2001 | Kashiyama |
| 2002/0028611 | A1 | * | 3/2002 | Hatagishi et al. |

FOREIGN PATENT DOCUMENTS

| EP | 0 732 772 A2 | 9/1996 |
| EP | 0 733 463 A2 | 9/1996 |
| EP | 0 733 464 A2 | 9/1996 |
| EP | 1079469 A2 | * 2/2001 |
| JP | 8-250183 | 9/1996 ........... H01R/13/42 |

OTHER PUBLICATIONS

Patent Abstract of Japan 08–250183, Sep. 27, 1996.

* cited by examiner

*Primary Examiner*—David J. Walczak
*Assistant Examiner*—Khoa Huynh
(74) *Attorney, Agent, or Firm*—Sughrue Mion, PLLC

(57) ABSTRACT

In a production apparatus (1), after rear holders (7a, 7b) and a housing body (8) are molded by molding die cavities, slides (11a, 11b) are moved apart from the housing body (8). Then, cylinders (16a, 16b) are driven to move the rear holders (7a, 7b), holders (13a, 13b) and the slides (11a, 11b) together with slide plates (14a, 14b), so that the rear holders (7a, 7b) are located in opposed relation to the housing body (8). Then, cylinders (19a, 19b) are driven to move the rear holders (7a, 7b) toward the housing body (8), thereby provisionally retaining the rear holders (7a, 7b) on the housing body (8). Therefore, the amount of movement of the slides (11a, 11b) is small, and it is not necessary to provide any space for holding the slides (11a, 11b), moved into their respective stand-by positions, and therefore the small-size design of the production apparatus can be achieved, and also the production efficiency can be enhanced.

2 Claims, 13 Drawing Sheets

METHOD OF AND APPARATUS FOR PRODUCING REAR HOLDER-ATTACHED CONNECTOR

BACKGROUND OF THE INVENTION

1. Field of the Invention

The present invention relates to a method of and apparatus for producing a rear holder-attached connector, in which after a housing body and a rear holder are molded in a metal molding die, the rear holder is provisionally retained on the housing body within the metal molding die, and connection terminals are received respectively in terminal receiving chambers formed in the housing body, and thereafter the rear holder is completely retained on the housing body.

The present application is based on Japanese Patent Application No. Hei. 11-361555, which is incorporated herein by reference.

2. Description of the Related Art

One example of a rear holder-attached connector, extensively used for connecting wire harnesses together or for connecting an electronic equipment to a wire harness in a vehicle such as an automobile, as well as a method of producing this connector, will be described with reference to FIGS. 12 and 13.

A housing body 41 and a pair of rear holders 42a and 42b are molded in molding die cavities (not shown), and at the time when the molding is completed, slides 43a and 43b, forming part of a metal molding die, are located respectively at opposite sides of the housing body 41 while holders 44a and 44b are located at side surfaces of the rear holders 42a and 42b, as shown in FIG. 12.

For provisionally retaining the rear holders 42a and 42b on the housing body 41, the slides 43a and 43b are moved apart (or retracted) from the housing body 41, and the holders 44a and 44b are inserted respectively into spaces obtained as a result of moving these slides, as shown in FIG. 13.

Then, the holders 44a and 44b are driven to move the rear holders 42a and 42b toward the housing body 41, and provisionally retain these rear holders 42a and 42b on the housing body 41.

The retracting movement of the slides 43a and 43b, the movement of the holders 44a and 44b in the lateral direction, and the movement of the rear holders 42a and 42b toward the housing body 41 for provisional retaining purposes are effected by air cylinders (not shown).

In the method of and the apparatus for producing the above rear holder-attached connector, the holders 44a and 44b are moved respectively into the spaces obtained as a result of moving the slides 43a and 43b apart from the housing body 41, and therefore the amount of retracting movement of the slides 43a and 43b need to be larger than the length of the holders 44a and 44b in the longitudinal direction.

Therefore, the production apparatus need to have spaces for receiving the holders 44a and 44b and the retracted slides 43a and 43b. Therefore, the production apparatus has a large size, and besides since the metal molding dies for molding purposes are used also for the above purpose, the production apparatus is complicated in construction, and there is needed a special molding machine. Thus, these problems have been encountered.

In addition, for producing many rear holder-attached connectors with the above sequential production method, it is necessary to increase the number of molding die cavities. However, there has been encountered a problem that it is difficult to mold many connectors at a time since the production apparatus becomes large in size.

SUMMARY OF THE INVENTION

The present invention has been made in view of the above problems, and an object of the present invention is to provide a method of and apparatus for producing a rear holder-attached connector, in which the production apparatus is simple in construction, and can have a small-size design.

To solve the above problems and achieve the above object, according to the first aspect of the present invention, there is provided a method of producing a connector which includes a housing body having an undercut portion and a terminal receiving chamber, into which a connection terminal is insertable, formed in the housing body, and further includes a rear holder for retaining the connection terminal received in the terminal receiving chamber. More specifically, the method comprises the steps of providing a metal molding die comprising a fixed molding die, a movable molding die which is movable toward and away from the fixed molding die, a slide for molding the housing body, a core and a holder both of which serve to mold the rear holder, molding the housing body, after the molding step for the housing body, driving the slide so that the undercut portion of the housing body is exposed, molding the rear holder, after the molding step for the rear holder, moving the core to expose a side surface of the rear holder to be opposed to the housing body, after the moving step, moving the rear holder and the slide into a position where the rear holder is to be attached to the housing body, and moving the rear holder toward the housing body fixed to the movable molding die, so that the rear holder is attached to the housing body in a provisionally-retained condition within the metal molding die.

In the above method, the slide for molding the housing body is moved apart from the housing body after the molding of the rear holder and the housing body. However, the slide can be moved in a lateral direction together with the holder for molding the rear holder, and therefore there is no need to provide a space for receiving the holder, and the overall size of the apparatus can be reduced, and also the production process can be simplified.

Furthermore, to solve the above problems and achieve the above object, according to the second aspect of the present invention, there is provided an apparatus for producing a connector which includes a housing body having an undercut portion and a terminal receiving chamber, into which a connection terminal is insertable, formed in the housing body, and further includes a rear holder for retaining the connection terminal received in the terminal receiving chamber. More specifically, the apparatus includes a metal molding die, and the metal molding die which comprises a fixed molding die, a movable molding die which is movable toward and away from the fixed molding die, and is associated with the fixed molding die to form separate molding die cavities for respectively molding the housing body and the rear holder, a slide movable apart from the housing body after the molding of the housing body, a core drawn into the movable molding die after the molding of the rear holder so as to expose a side surface of the rear holder to be opposed to the housing body, a holder holding the rear holder, a first cylinder which moves the rear holder together with the slide and the holder, and locates the rear holder at a position where the rear holder is opposed to the housing body, and a second cylinder which moves the located rear holder toward the housing body through the holder, so that the rear holder is attached to the housing body in a provisionally-retained condition within the metal molding die.

In the above apparatus, after the rear holder and the housing body are molded, the slide is moved apart from the housing body, and the first cylinder is driven to move the holder, holding the rear holder, together with the slide, so as to move the rear holder toward the position of the housing body. Then, the second cylinder is driven to move the rear holder toward the housing body, thereby provisionally retaining the rear holder on the housing body.

Therefore, the slide and the holder are moved in unison with each other, and there is no need to provide a space for receiving the holder, and the amount of movement of the slide is small, and therefore the overall size of the apparatus can be reduced, and also the production efficiency can be enhanced.

DETAILED DESCRIPTION OF THE PREFERRED EMBODIMENT

One preferred embodiment of a rear holder-attached connector-producing apparatus of the present invention, as well as a rear holder-attached connector-producing method of the present invention, now will be described in detail with reference to FIGS. 1 to 11.

In the description of this embodiment, for better understanding of the present invention, the constructions of the production apparatus, the rear holders and the housing body will be first described, and then the production method will be described.

The rear holder-attached connector-producing apparatus (hereinafter referred to merely as "production apparatus") 1 of this embodiment has a molding function of molding the rear holders 7a and 7b (described later) and the housing body 8 (described later), and a function of provisionally retaining (mounting) the molded rear holders 7a and 7b on the housing body 8. Therefore, the production method, performed by the production apparatus 1, has the function of effecting the sequential operation from the molding operation by the metal molding dies to the provisionally-retaining operation. However, in this embodiment described below, the operation for mounting the rear holders 7a and 7b on the housing body 8 will be mainly described as the production method.

Figure 1:
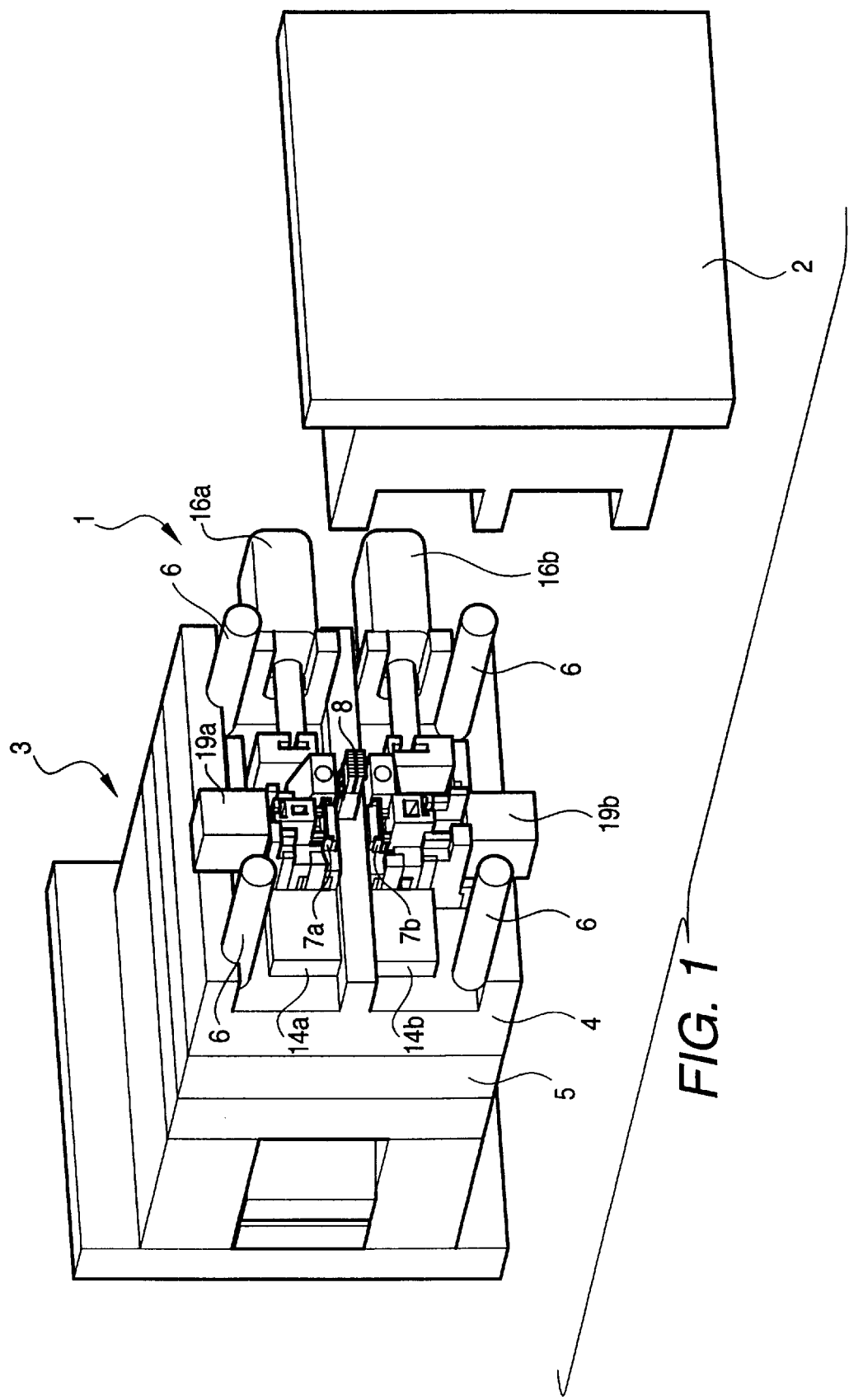
FIG. 1 is an exploded, perspective view showing the construction of a rear holder-attached connector-producing apparatus of the present invention.

First, the basic construction of the production apparatus 1 will be described. This production apparatus comprises a fixed molding die 2 (shown at a front right portion of FIG. 1), and the movable molding die 3 (shown at a rear left portion of FIG. 1). The movable molding die 3 comprises a stripper 4 (provided at a front side) and a base portion 5. As shown in FIG. 1, the stripper 4 and the base portion 5 are moved toward each other to be joined together to form the movable molding die 3, and also these two members, that is, the stripper 4 and the base portion 5, can be moved apart from each other as indicated by arrows A and B in FIG. 4.

When the movable molding die 3 is moved to be mated with the fixed molding die 2, molding die cavities for respectively molding the pair of upper and lower rear holders 7a and 7b and the housing body 8 are formed between the fixed molding die 2 and the movable molding die 3.

Guide pins 6 extend through four corner portions of the stripper 4, respectively, and serve to effect a guiding operation when mating the fixed molding die 2 and the movable molding die 3 with each other so as to form the molding die cavities (not shown), and also serve to effect a guiding operation when moving the stripper 4 toward and away from the base portion 5 as described later.

In the perspective views of FIGS. 1, 2, 4 and 8, showing the production apparatus 1, although the showing of runners for pouring a synthetic resin is omitted for illustration purposes, the runners 9 are shown in FIGS. 3 and 5 to 7. Therefore, when the fixed molding die 2 and the movable molding die 3 are mated together, the molding die cavities, communicating with the runners 9, are formed, and when the synthetic resin is poured through a pouring port 9a, so that the pair of upper and lower rear holders 7a and 7b and the housing body 8 are molded independently of one another.

When the movable molding die 3 is moved apart from the fixed molding die 2 after the molding operation, the rear holders 7a and 7b and the housing body 8, held on the movable molding die 3, are exposed. Slides 11a and 11b are provided at a side surface of the movable molding die 3, that is, a side surface of the stripper 4 opposed to the fixed molding die 2, and these slides 11a and 11b form part of the metal molding die when molding the housing body 8, and are controlled to move apart from the housing body 8 after the molding operation.

Also, cores 12a and 12b and holders 13a and 13b are provided at the side surface of the stripper 4. The cores 12a and 12b form part of the metal molding die when molding the rear holders 7a and 7b, and are controlled to be drawn into the stripper 4 from side surfaces of the rear holders 7a and 7b after the molding operation. The holders 13a and 13b form part of the metal molding die during the molding operation.

The slide 11a and the holder 13a are mounted on the slide plate 14a which is mounted on the side surface of the stripper 4 so as to reciprocally move in a lateral direction. The slide 11b and the holder 13b are mounted on the slide plate 14b which is mounted on the side surface of the stripper 4 so as to reciprocally move in the lateral direction.

Cylinders 16a and 16b, which are independent of the slide plates 14a and 14b, are provided at the side surface of the stripper 4. Rods 17a and 17b of the cylinders 16a and 16b are loosely fitted respectively in slide blocks 18a and 18b provided respectively at one ends of the slide plates 14a and 14b.

Cylinders 19a and 19b are mounted on the slide plates 14a and 14b, respectively, and rods 20a and 20b (shown in FIG. 3) are loosely fitted in one ends of the holders 13a and 13b, respectively. The cylinders 16a and 16b correspond to first cylinders in the present invention, and the cylinders 19a and 19b correspond to second cylinders in the present invention.

Figure 2:
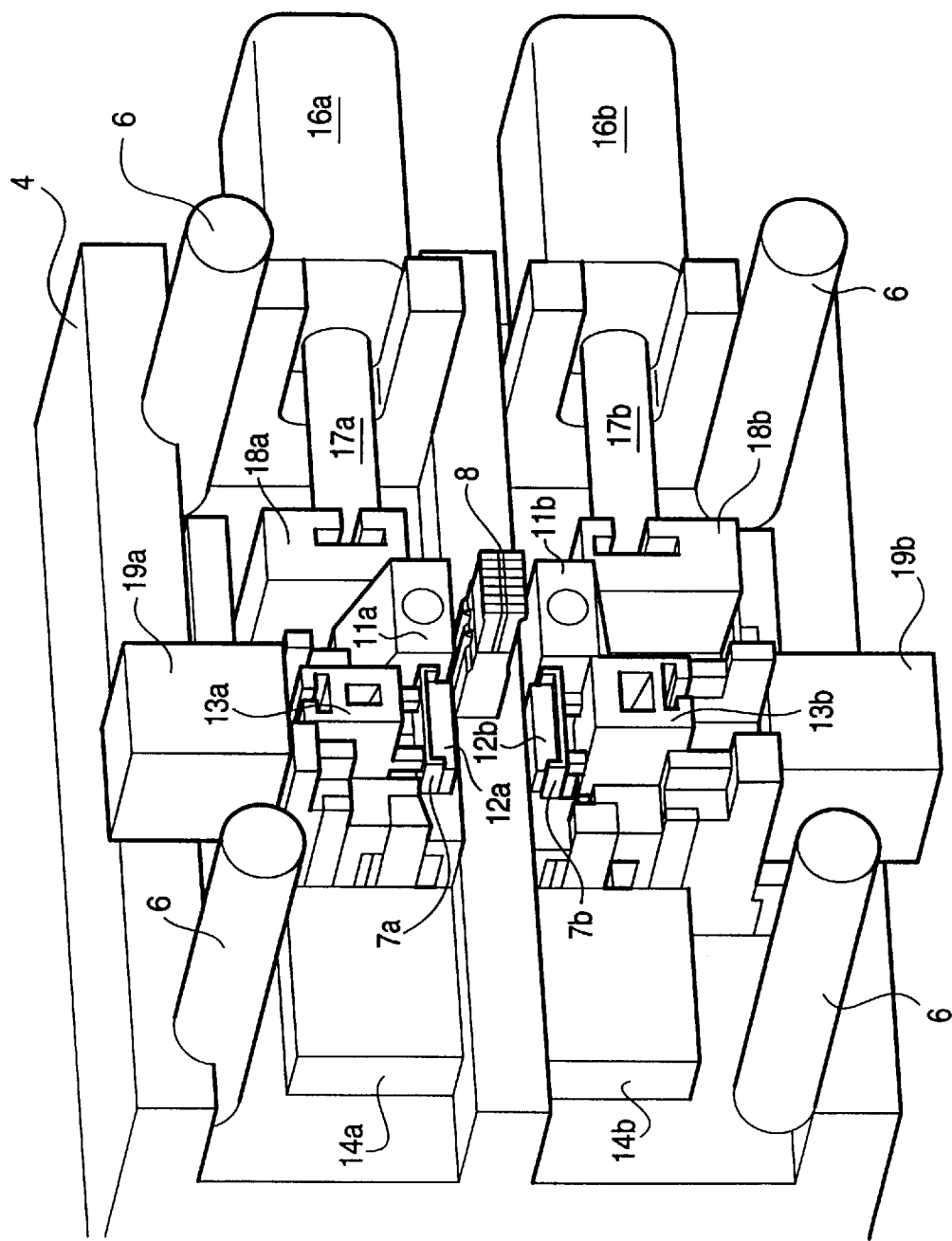
FIG. 2 is an enlarged, perspective view of an important portion of FIG. 1, showing the construction of a movable molding die.
Figure 3:
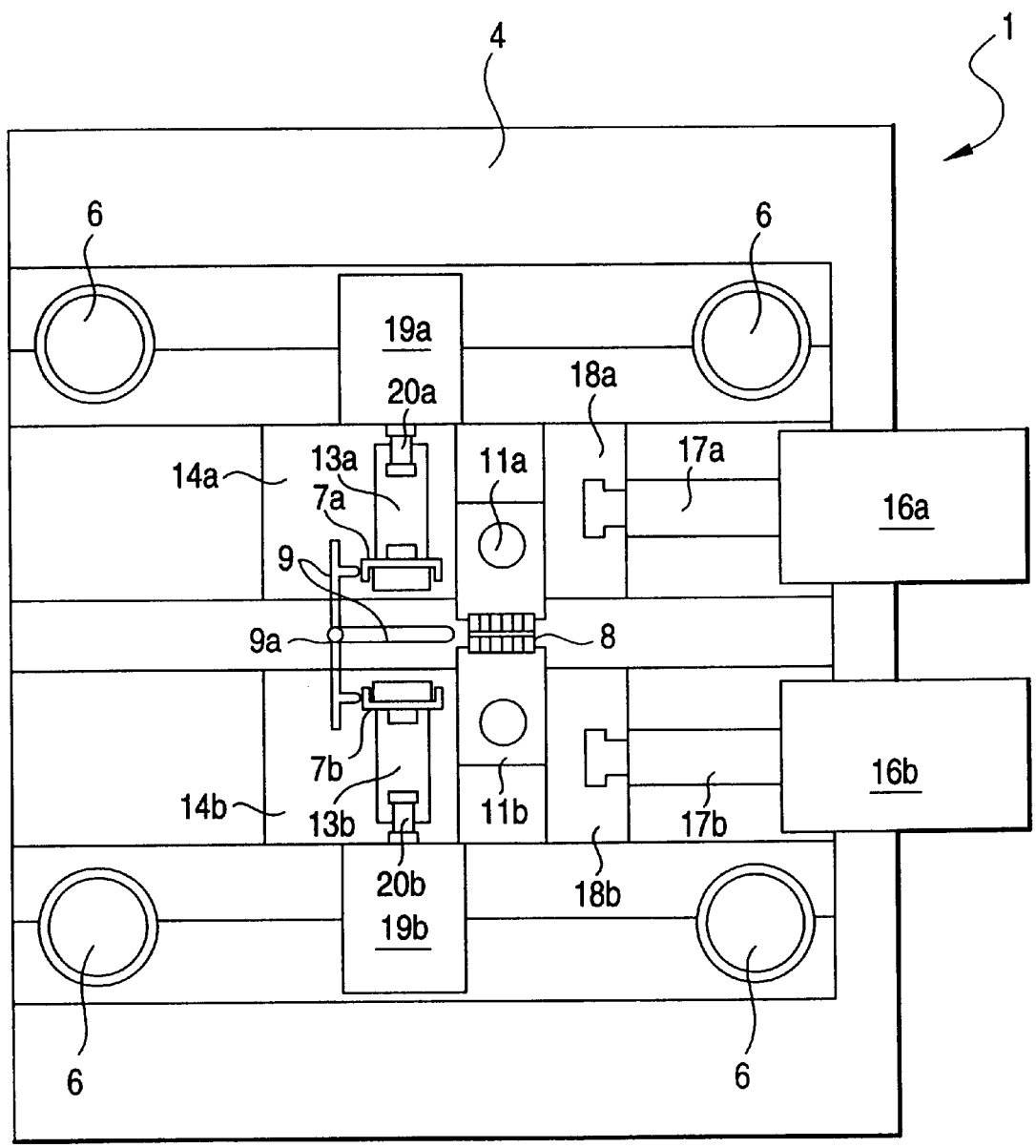
FIG. 3 is a schematic side-elevational view of FIG. 2.

In this construction, when the cylinders 16a and 16b are driven, the rods 17a and 17b are retracted right from their respective positions shown in FIGS. 2 and 3, and at the same time, the slide plates 14a and 14b are moved together with the rods 17a and 17b, respectively. Since the slides 11a and 11b, the holders 13a and 13b and the cylinders 19a and 19b are mounted on the slide plates 14a and 14b, these parts are also moved right when the cylinders 16a and 16b are driven.

The cylinders 19a and 19b are driven so as to provisionally retain the pair of rear holders 7a and 7b on the housing body 8.

Figure 9:
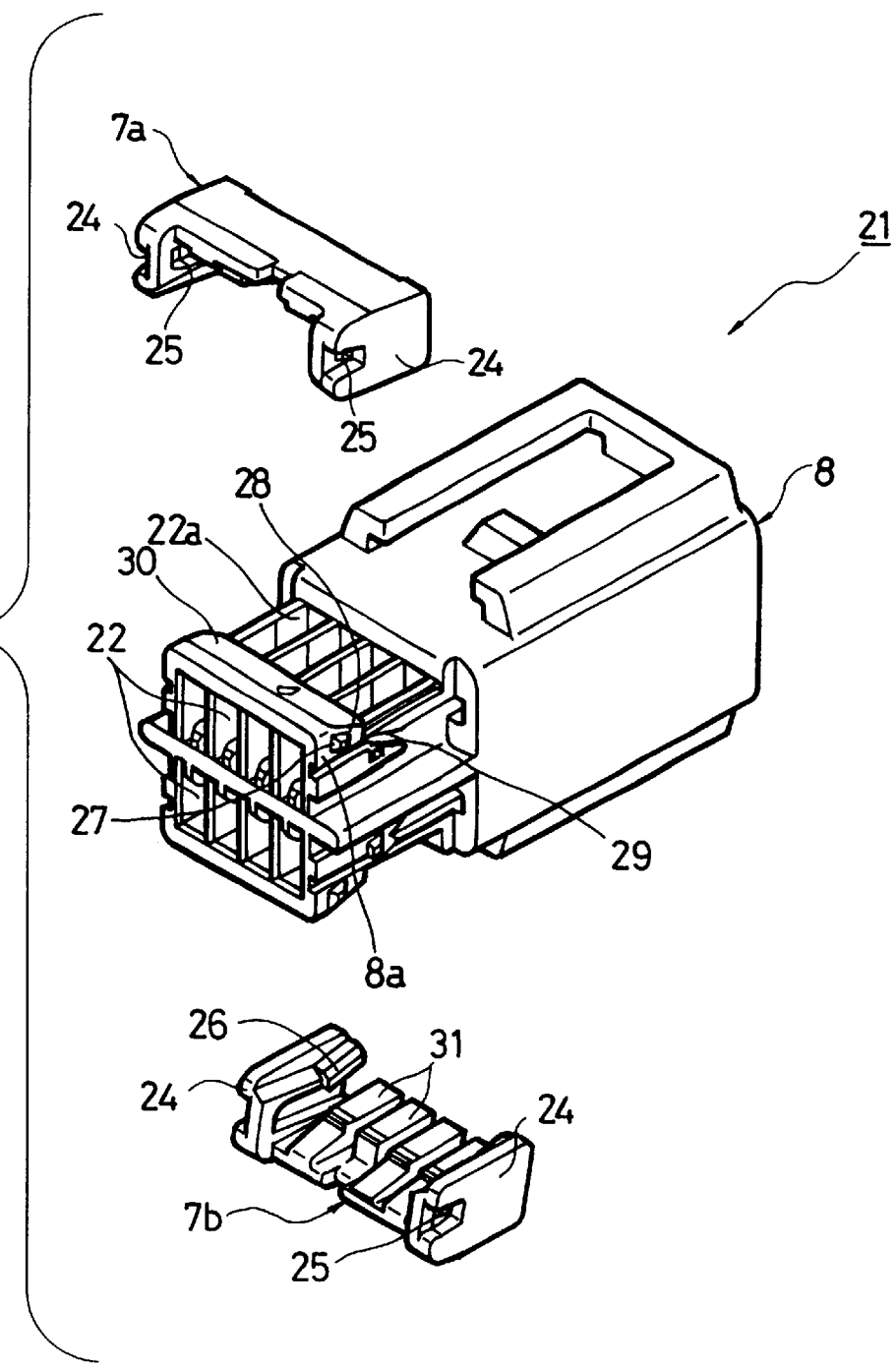
FIG. 9 is an exploded, perspective view showing the construction of the rear holder-attached connector.

Here, for better understanding, the molded connector 21, having the rear holders attached thereto, will be described. As shown in FIG. 9, a plurality of terminal receiving chambers 22 are formed in the housing body 8, and open portions 22a, formed respectively in upper and lower sides of this housing body, correspond to undercut portions in the present invention.

The rear holders 7a and 7b in their provisionally-retained condition cover large portions of the open portions 22a, respectively, and these rear holders 7a and 7b in their completely-retained condition completely cover the open portions 22a, respectively. In this embodiment, the upper rear holder 7a and the lower rear holder 7b (in the drawings) are provisionally retained on the housing body in such a manner that each rear holder is disposed astride the corresponding row of terminal receiving chambers 22.

Figure 10:
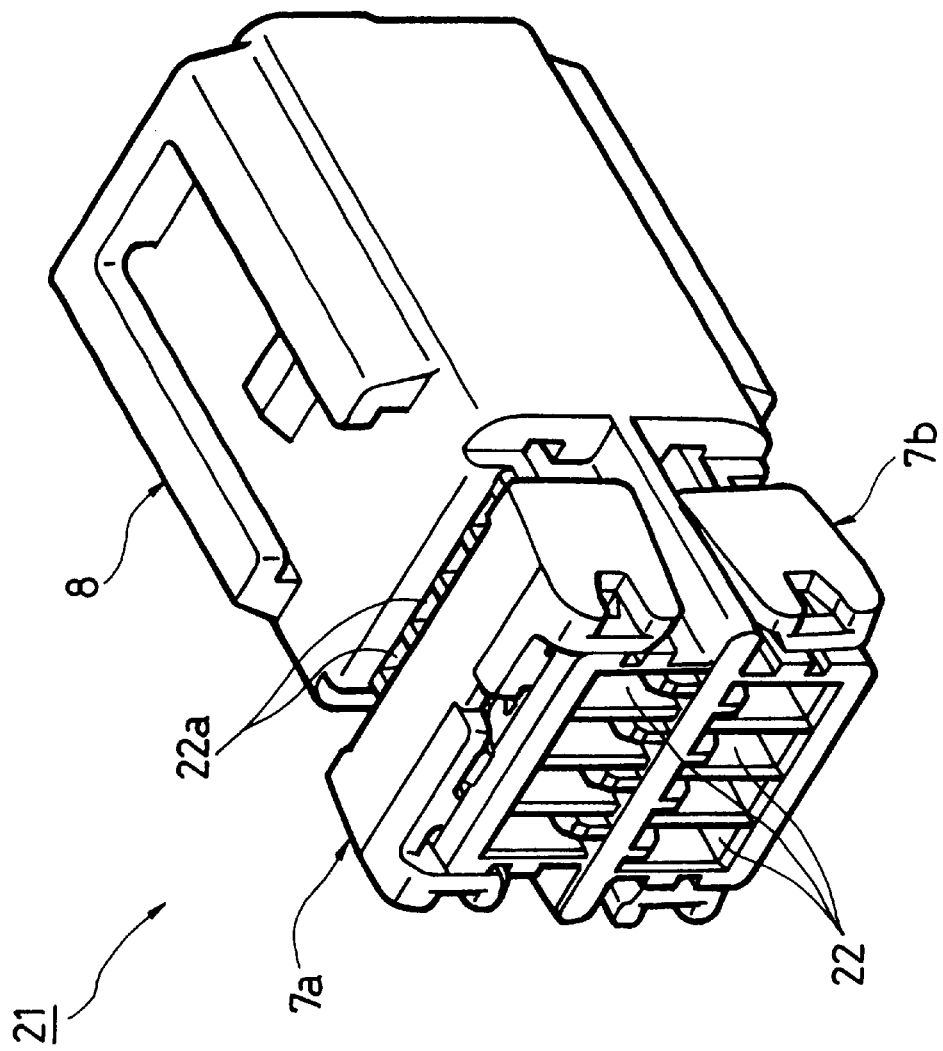
FIG. 10 is a perspective view showing a condition in which the rear holders are provisionally retained on the housing body.
Figure 11:
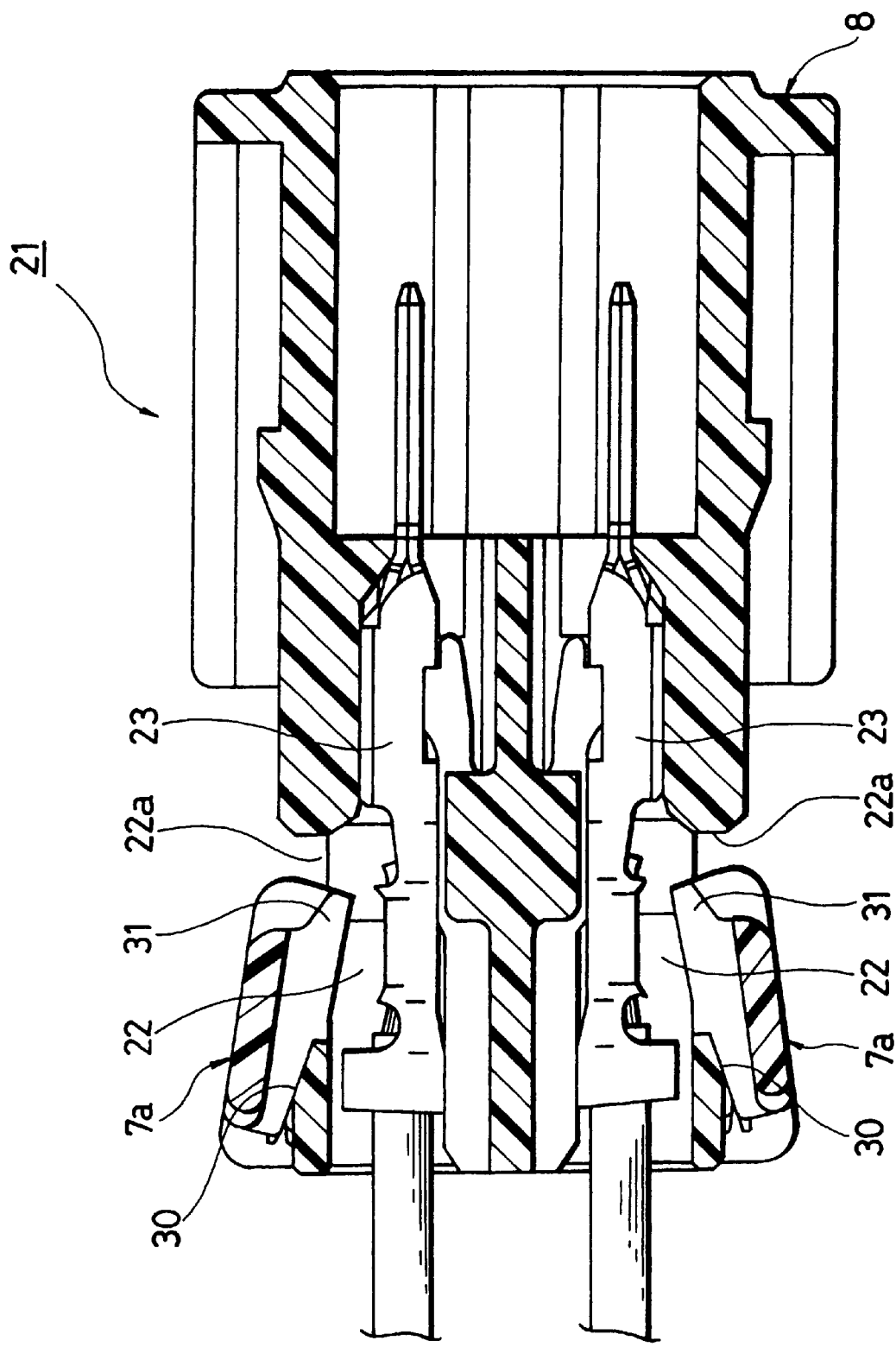
FIG. 11 is a cross-sectional view through the connector of FIG. 10.
Figure 12:
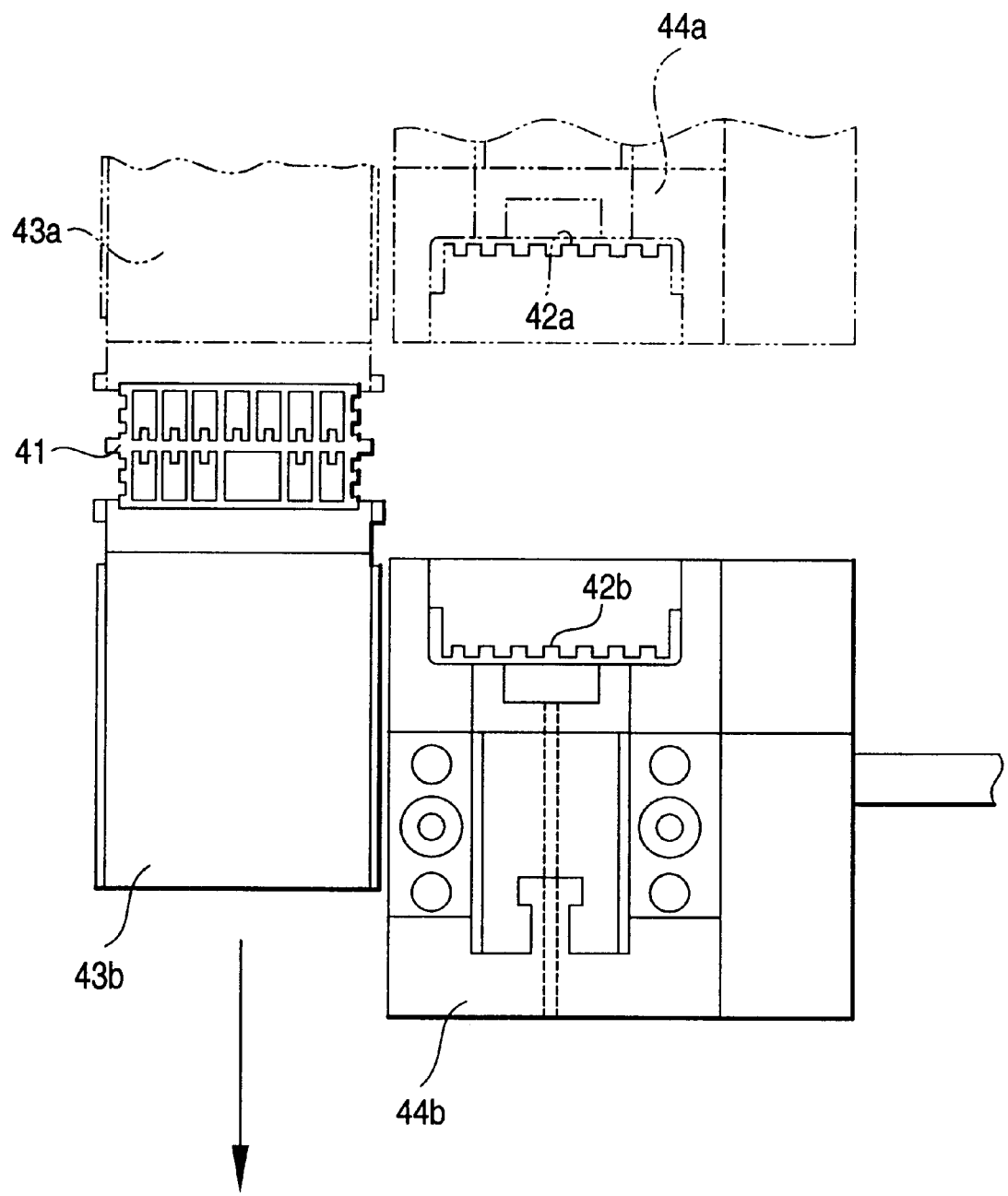
FIG. 12 is a schematic view showing a related, rear holder-attached connector-producing apparatus.
Figure 13:
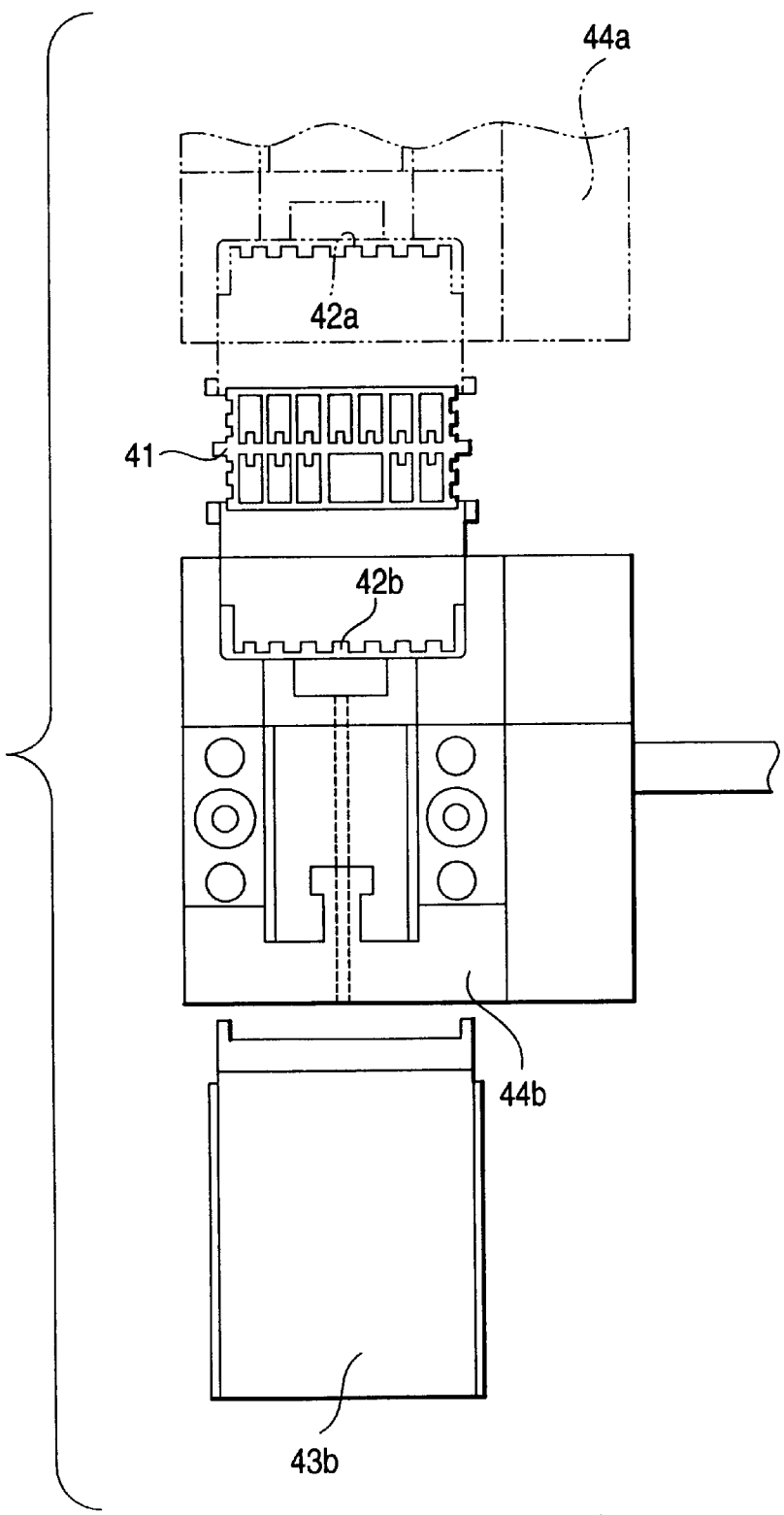
FIG. 13 is a schematic view showing a condition in which slides in FIG. 12 are moved.

The term "provisional retaining" means a condition in which the rear holder is retained on the housing body in a manner to allow connection terminals 23 (described later) to be received in the respective terminal receiving chambers 22. Namely, when the rear holders are held in the provisionally-retained condition, the connection terminals 23 can be inserted respectively into the terminal receiving chambers 22 as shown in FIGS. 10 and 11. In the condition shown in FIG. 11, when the rear holders 7a and 7b are further pushed into the terminal receiving chambers 22, the connection terminals 23 are prevented from withdrawal, and this condition is referred to as a completely-retained condition.

Next, the method of producing the rear holder-attached connector 21 (that is, the method in which the rear holders 7a and 7b and the housing body 8 are molded, and thereafter the rear holders 7a and 7b are provisionally retained on the housing body 8) will be described.

In an initial condition in which the rear holders 7a and 7b and the housing body 8 are molded, the stripper 4 and the base portion 5 are joined together as shown in FIG. 1, and the cores 12a and 12b are projected in contiguous relation to the side surfaces of the rear holders 7a and 7b, respectively, as shown in FIGS. 2 and 3, and the slides 11a and 11b support the housing body 8 from the upper and lower sides thereof as shown in FIG. 3.

Figure 4:
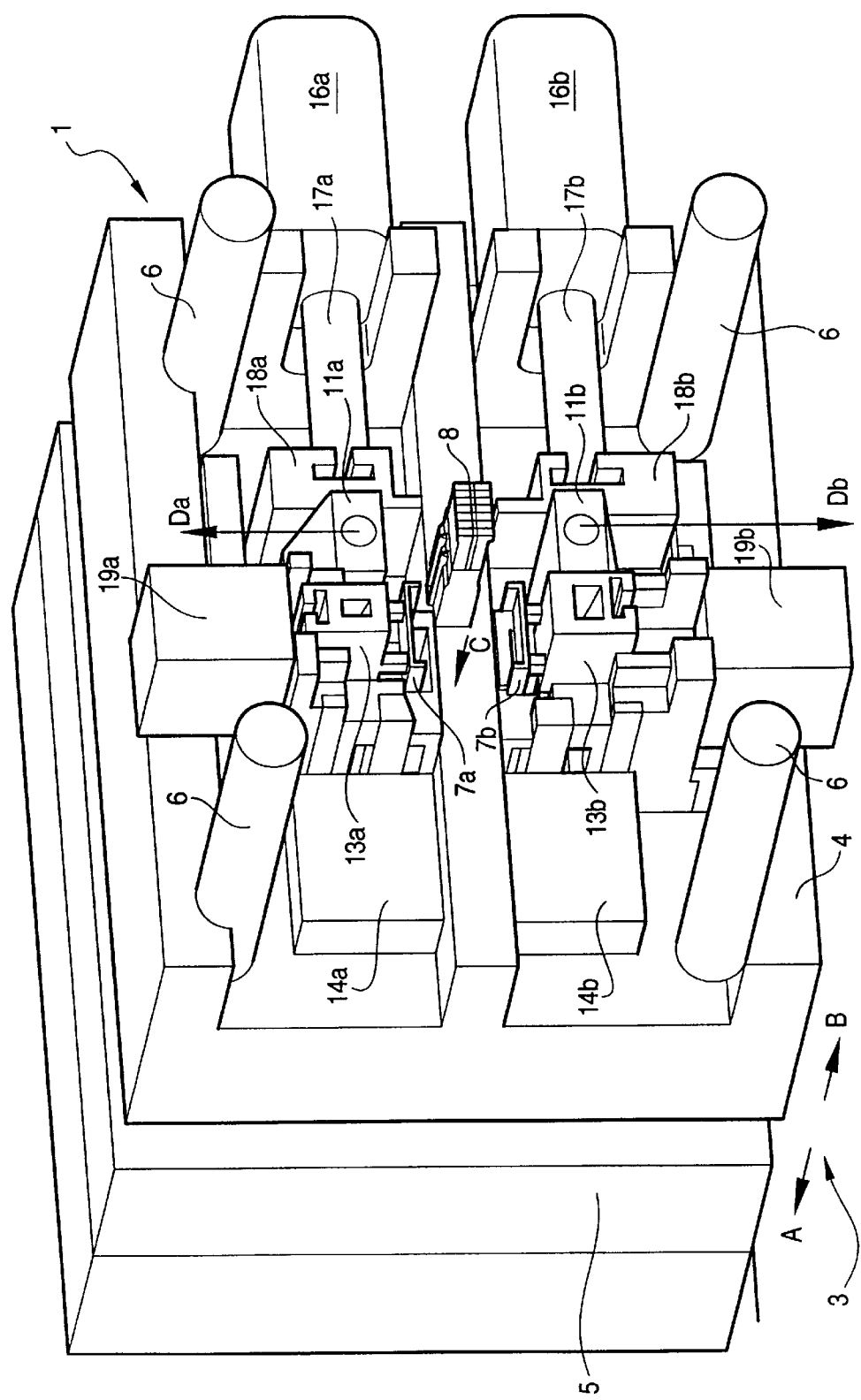
FIG. 4 is a perspective view showing the construction of an important portion of the production apparatus, as well as a rear holder-attached connector-producing method.

In this initial condition, when the stripper 4 and the base portion 5 are driven to be moved away from each other as indicated by arrows A and B in FIG. 4, the cores 12a and 12b (see FIG. 2) are drawn into the stripper 4 as indicated by arrow C, and the slide 11a is driven to be moved in a direction Da while the slide 11b is driven to be moved in a direction Db. At this time, any of the cylinders 16a, 16b, 19a and 19b is not yet driven, and the rear holders 7a and 7b and the housing body 8 are kept in their respective molded positions.

Figure 5:
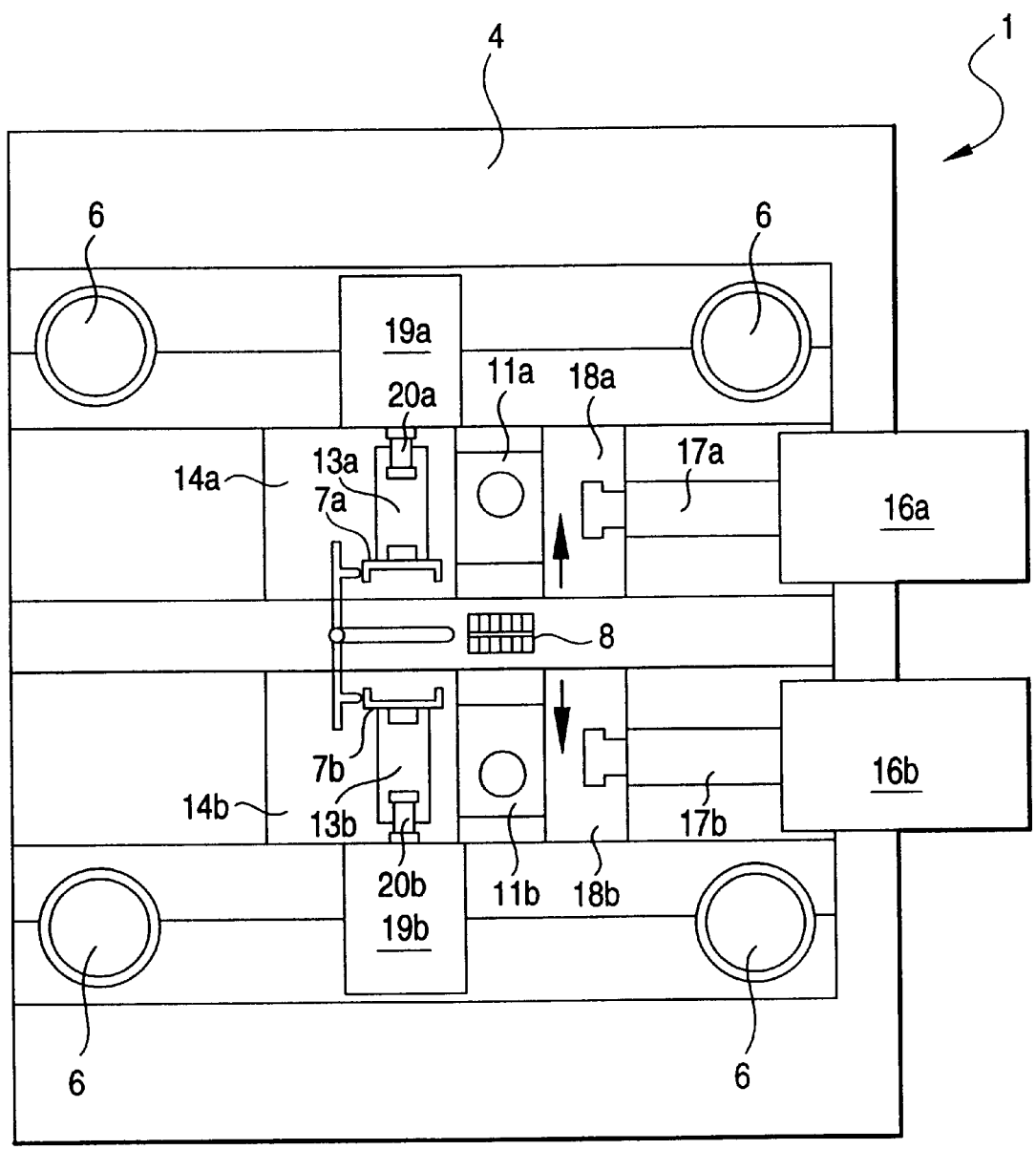
FIG. 5 is a schematic side-elevational view showing the construction of an important portion of the production apparatus, as well as the production method.
Figure 6:
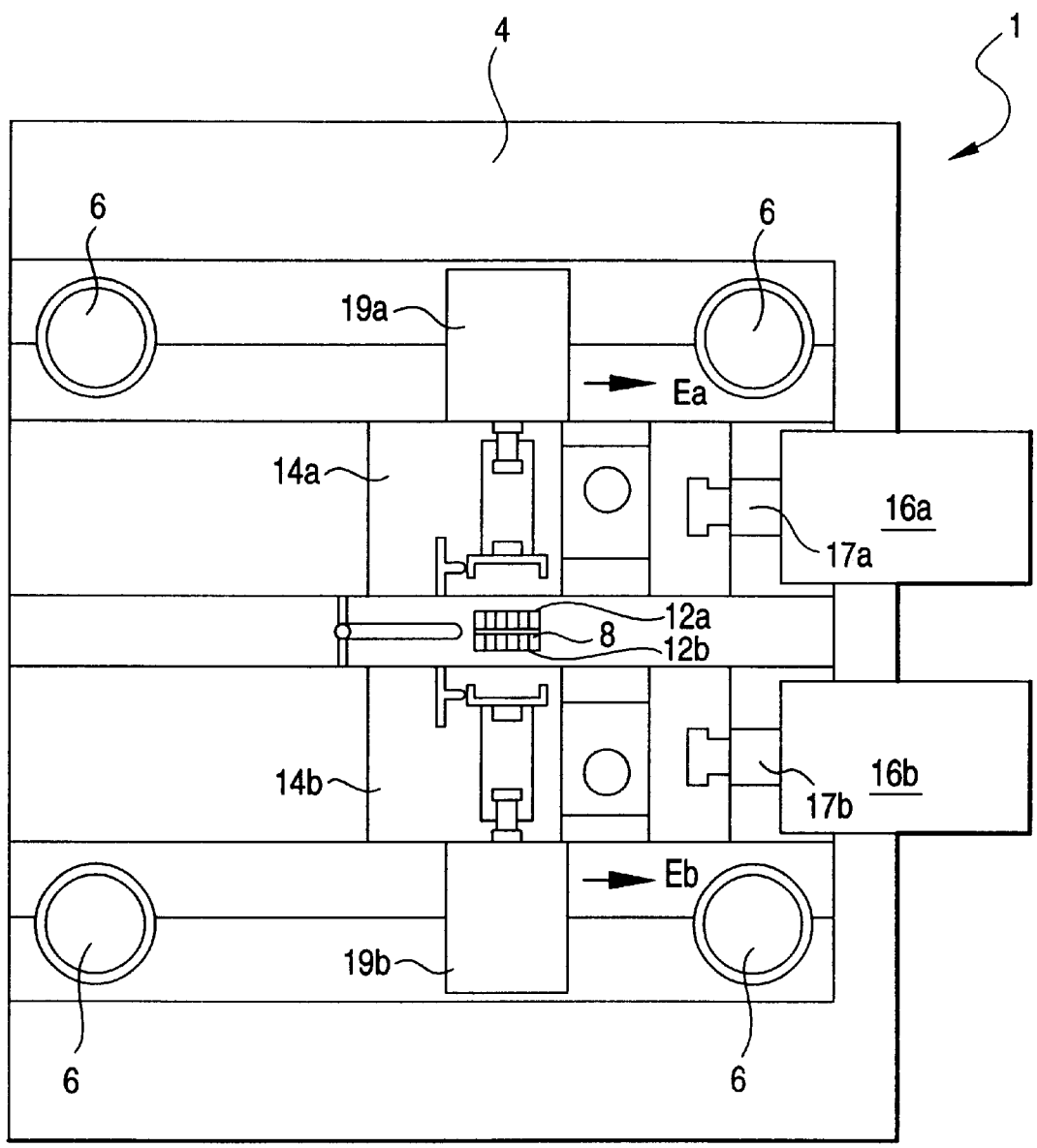
FIG. 6 is a schematic side-elevational view, showing the movement of slide plates in FIG. 5.

In the above initial condition, when the cylinders 16a and 16 are driven as shown in FIG. 5, the rods 17a and 17b are retracted to move the slide plates 14a and 14b in the right-hand direction as indicated by arrows Ea and Eb in FIG. 6, so that the rear holders 7a and 7b are moved to a fixed position of the housing body 8. In this condition, when the cylinders 19a and 19b are driven, the rods 20a and 20b are extended as indicated by arrows Fa and Fb in FIG. 7, so that the rear holders 7a and 7b (see FIG. 5) are moved into engagement with the side surfaces of the housing body 8, that is, into their respective rear holder-provisionally retaining positions, through the holders 13a and 13b, and are provisionally retained on the housing body.

Figure 8:
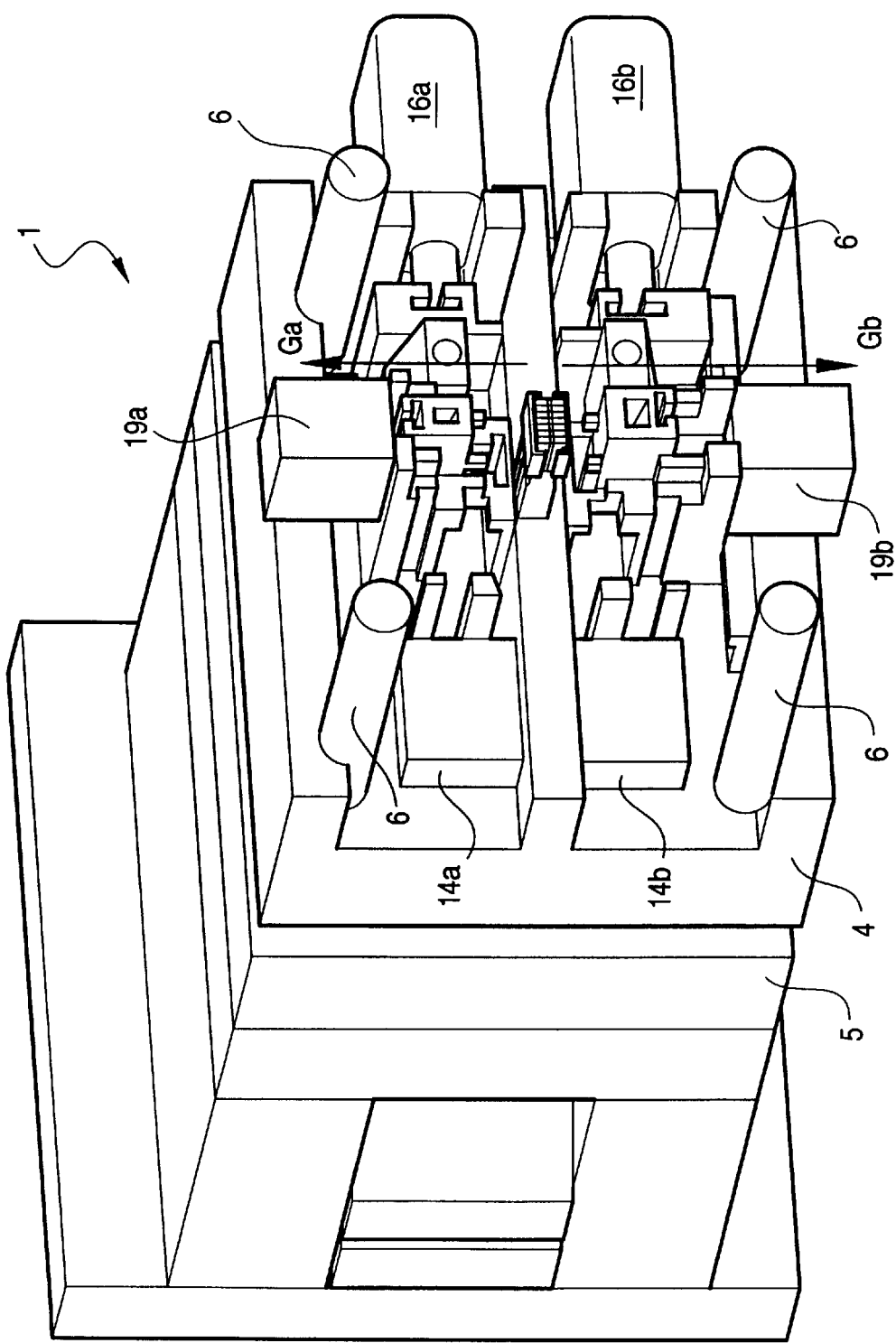
FIG. 8 is a perspective view showing a condition in which the provisional retaining of the rear holders on the housing body is completed.

Then, when the driving of the cylinders 19a and 19b is stopped, the rods 20a and 20b are retracted, and the holders 13a and 13b are moved apart from the rear holders 7a and 7b, respectively, as indicated by arrows Ga and Gb in FIG. 8, thus completing the provisional retaining of the rear holders on the housing body.

After the provisional retaining is completed, the housing body 8, having the rear holders 7a and 7b provisionally retained thereon, is removed from the stripper 4, and then the slide plates 14a and 14b are returned respectively into their initial positions by the cylinders 16a and 16b. Then, when the stripper 4 and the base portion 5 are moved toward each other to be joined together, the cores 12a and 12b are projected into their respective initial positions. Thus, the production method, comprising the sequential steps from the molding to the provisional retaining, can be effected.

Next, the rear holders 7a and 7b and the housing body 8 will be described in detail with reference to FIGS. 9 to 11. As described above, the plurality of terminal receiving chambers 22 are formed in the housing body 8, and the upper rear holder 7a and the lower rear holder 7b (in the drawings) are provisionally retained on the housing body in such a manner that each rear holder is disposed astride the corresponding row of terminal receiving chambers 22. Each of the rear holders 7a and 7b has a U-shaped cross-section, and retaining holes 25 are formed respectively in inner surfaces of right and left side walls 24 of the rear holder, and also retaining claws 26, each having a slanting surface, are formed respectively on the inner surfaces of the right and left side walls 24.

On the other hand, provisionally-retaining projections 28, each having a tapering surface 27, as well as retaining steps 29, are formed respectively on opposite side surfaces 8a of a rear end portion of the housing body 8. A slanting abutment surface 30 for holding the reverse surface of the rear holder 7a, 7b so as to guide the same is formed on each of the upper and lower sides of the housing body in which the open portions 22a of the terminal receiving chambers 22 are formed, respectively.

In the above production method, at the stage of FIG. 6, the rear holders 7a and 7b are located in registry with the open portions 22a in the housing body 8, respectively, as shown in FIG. 9.

Figure 7:
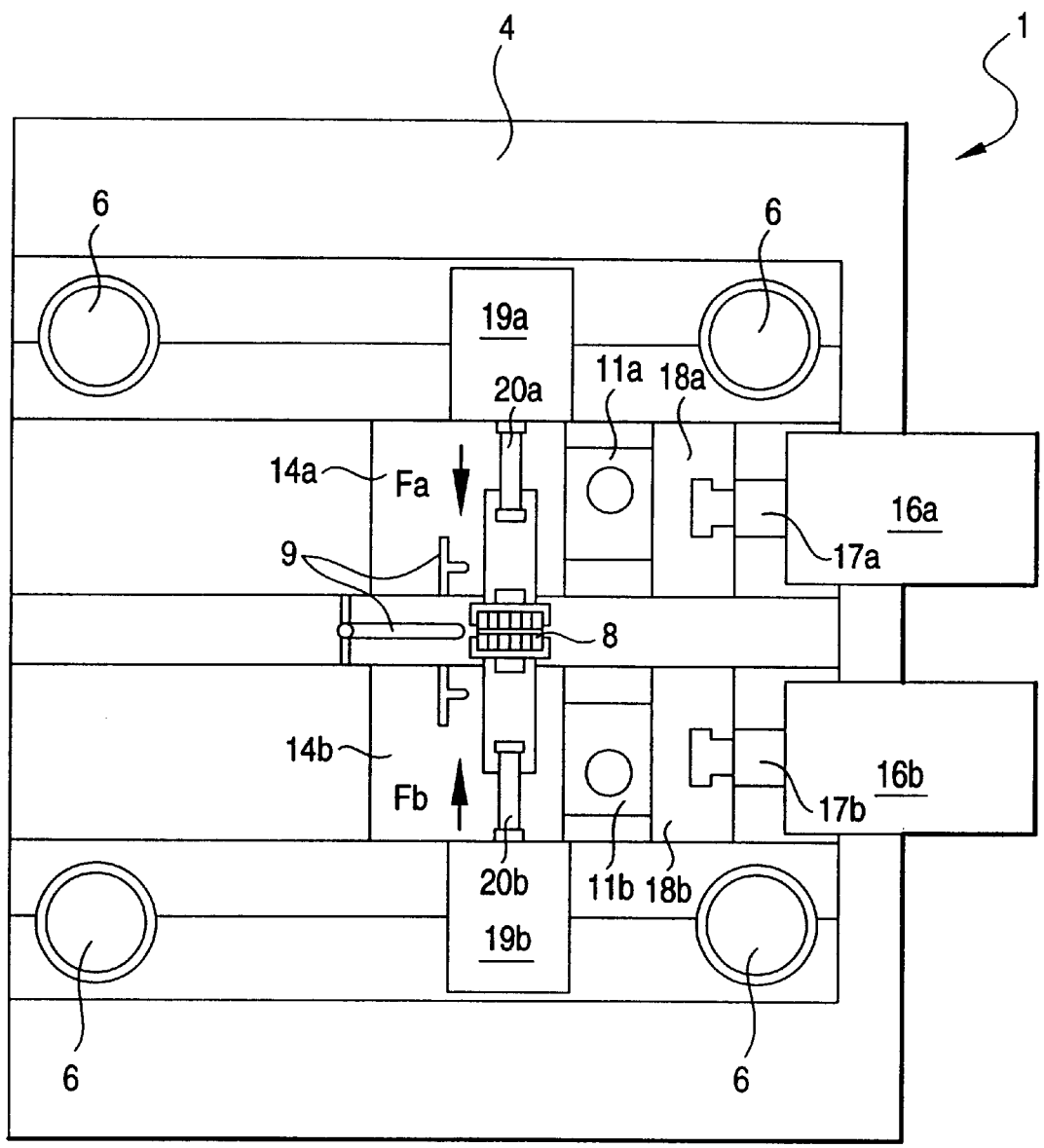
FIG. 7 is a schematic side-elevational view showing a condition in which rear holders are mounted on a housing body.

At the stage of FIG. 7, the rear holders 7a and 7b are provisionally retained on the housing body 8, as shown in FIG. 10. In this provisional retaining, the provisionally-retaining projections 28 are engaged in the retaining holes 25 (shown in FIG. 9), respectively, and upon pivotal movement of each rear holder 7a, 7b, the retaining claws 26 are engaged with the retaining steps 29, respectively, and at the same time the reverse surface of the rear holder 7a, 7b is abutted against the abutment surface 30.

In the above provisionally-retained condition, secondary retaining projections 31, formed on the rear holder 7a, 7b, are inserted respectively into the terminal receiving chambers 22 through the open portion 22a, as shown in FIG. 11. Then, the connection terminals 23 are received in the terminal receiving chambers 22, respectively, and then when each rear holder 7a, 7b is further pushed into the housing body, the connection terminals 23 are retained by the secondary retaining projections 31, respectively. In this manner, each rear holder is shifted from the provisionally-retained condition to the completely-retained condition, thus completing the rear holder-attached connector 21.

As described above, in this embodiment, the slides 11a and 11b, as well as the holders 13a and 13b, are mounted on the slide plates 14a and 14b, respectively, and the second cylinders 19a and 19b for respectively driving the holders 13a and 13b so as to provisionally retain the rear holders 7a and 7b on the housing body 8 are also mounted on the slide plates 14a and 14b, respectively. Therefore, the slides 11a and 11b are moved apart from the housing body 8, and then the first cylinders 16a and 16b are driven to move the slide plates 14a and 14b in the lateral direction, and merely by doing so, the rear holders 7a and 7b are located in opposed relation to the housing body 8, respectively.

Therefore, the amount of movement of the slides 11a and 11b is small, and the time, required for the production process, is reduced, thereby enhancing the efficiency of the operation. And besides, spaces for respectively receiving the slides 11a and 11b do not need to be provided outwardly of the holders 13a and 13b, and therefore the production apparatus can have a small-size design.

The method of and apparatus for producing the rear holder-attached connector are not limited to the above embodiment, but various modifications can be made. For example, although this embodiment is directed to the method of producing one rear holder-attached connector, a plurality of connectors are actually produced at a time, and many connectors can be produced at a time without increasing the overall size of the production apparatus.

In this embodiment, although the rear holders are retained on the opposite sides of the housing body, respectively, the present invention can be applied to the type of connector in which a rear holder is provisionally retained on one side surface of a housing body.

As described above, in the rear holder-attached connector-producing method and apparatus of the present invention, after the rear holder and the housing body are molded, the slide is moved apart from the housing body, and the first cylinder is driven to move the holder, holding the rear holder, together with the slide so as to move the rear holder to the predetermined position where the rear holder is disposed in opposed relation to the housing body. Then, the second cylinder is driven to move the rear holder toward the housing body, thereby provisionally retaining the rear holder on the housing body.

Therefore, the slide and the holder are moved in unison with each other, and it is not necessary to move only the slide in a large amount in a different direction. Therefore, it is not necessary to provide a space for holding the slide in a stand-by condition, and also it is not necessary to provide a control mechanism for moving only the slide. Therefore, the production apparatus can be reduced in size, and can be simplified, and the production efficiency can be enhanced.

What is claimed is:

1. A method of producing a connector which includes a housing body having an undercut portion and a terminal receiving chamber, into which a connection terminal is insertable, formed in the housing body, and further includes a rear holder for retaining the connection terminal received in the terminal receiving chamber, the method comprising the steps of:

providing a metal molding die comprising a fixed molding die, a movable molding die which is movable toward and away from the fixed molding die, a slide for molding the housing body, a core and a holder both for molding the rear holder;

molding the housing body;

after the molding step for the housing body, driving the slide in a slide moveable direction so that the undercut portion of the housing body is exposed;

molding the rear holder;

after the molding step for the rear holder, moving the core to expose a side surface of the rear holder to be opposed to the housing body such that the housing body is offset from the rear holder in the slide moveable direction;

after the moving step, moving the rear holder and the slide into a position where the rear holder is to be attached to the housing body such that the rear holder is aligned with and opposed to the housing body in the slide moveable direction; and moving the rear holder toward the housing body fixed to the movable molding die, so that the rear holder is attached to the housing body in a provisionally-retained condition within the metal molding die;

wherein both the rear holder and the housing body remain on the movable molding die before and during the attachment of the rear holder to the housing body.

2. An apparatus for producing a connector which includes a housing body having an undercut portion and a terminal receiving chamber, into which a connection terminal is insertable, formed in the housing body, and which further includes a rear holder for retaining the connection terminal received in the terminal receiving chamber, the apparatus including a metal molding die comprising:

a fixed molding die;

a movable molding die which is movable toward and away from the fixed molding die, and is associated with the fixed molding die to form separate molding die cavities for respectively molding the housing body and the rear holder such that the housing body is offset from the rear holder in the slide moveable direction;

a slide movable apart from the housing body in the slide moveable direction after the molding of the housing body;

a core drawn into the movable molding die after the molding of the rear holder so as to expose a side surface of the rear holder to be opposed to the housing body;

a holder holding the rear holder;

a first cylinder which moves the rear holder together with the slide and the holder, and locates the rear holder at a first position where the rear holder is aligned with and opposed to the housing body in the slide moveable direction; and a second cylinder which moves the rear holder from the first position toward the housing body through the holder, so that the rear holder is attached to the housing body in a provisionally-retained condition within the metal molding die;

wherein the rear holder and the housing body remain on the moveable molding die before and during the attachment of the rear holder to the housing body.

* * * * *